(12) United States Patent
Eckert et al.

(10) Patent No.: US 8,552,681 B2
(45) Date of Patent: Oct. 8, 2013

(54) POWER STORAGE SYSTEM FOR A RAIL-GUIDED VEHICLE

(75) Inventors: Peter Eckert, Erlangen (DE); Michael Meinert, Erlangen (DE); Karsten Rechenberg, Dormitz (DE)

(73) Assignee: Siemens Aktiengesellschaft, Munich (DE)

( * ) Notice: Subject to any disclaimer, the term of this patent is extended or adjusted under 35 U.S.C. 154(b) by 236 days.

(21) Appl. No.: 12/934,525

(22) PCT Filed: Feb. 11, 2009

(86) PCT No.: PCT/EP2009/051570
§ 371 (c)(1),
(2), (4) Date: Sep. 24, 2010

(87) PCT Pub. No.: WO2009/121656
PCT Pub. Date: Oct. 8, 2009

(65) Prior Publication Data
US 2011/0018492 A1    Jan. 27, 2011

(30) Foreign Application Priority Data
Mar. 31, 2008   (DE) .......................... 10 2008 016 739

(51) Int. Cl.
*H01M 10/44* (2006.01)
*B60K 1/00* (2006.01)
*B60L 1/00* (2006.01)

(52) U.S. Cl.
USPC ............ 320/101; 307/9.1; 903/903; 180/65.1

(58) Field of Classification Search
USPC .......................................................... 320/101
See application file for complete search history.

(56) References Cited

U.S. PATENT DOCUMENTS

| | | | |
|---|---|---|---|
| 6,066,928 A | 5/2000 | Kinoshita et al. | |
| 6,469,469 B1 * | 10/2002 | Chambers et al. | ............ 318/801 |
| 6,888,336 B2 * | 5/2005 | Kuehner et al. | ............... 318/801 |
| 6,938,555 B2 * | 9/2005 | Jöckel | .......... 105/34.1 |
| 7,398,844 B2 * | 7/2008 | Ishikawa et al. | ......... 180/65.285 |
| 7,663,343 B2 * | 2/2010 | Soma et al. | ................... 320/134 |
| 2004/0140139 A1 | 7/2004 | Malik | |
| 2005/0000741 A1 | 1/2005 | Holl et al. | |
| 2005/0251299 A1 | 11/2005 | Donnelly et al. | |
| 2008/0143284 A1 | 6/2008 | Kragh et al. | |

FOREIGN PATENT DOCUMENTS

| | | |
|---|---|---|
| DE | 19646396 A1 | 5/1998 |
| DE | 102006043831 A1 | 3/2008 |
| EP | 1424494 A1 | 6/2004 |
| EP | 1691476 A1 | 8/2006 |

\* cited by examiner

*Primary Examiner* — M'Baye Diao
(74) *Attorney, Agent, or Firm* — Laurence A. Greenberg; Werner H. Stemer; Ralph E. Locher

(57) ABSTRACT

An energy storage system for a track-guided vehicle includes at least one electrical energy storage device and at least one electrochemical energy storage device connected through at least one converter to a supply line and to a drive unit for the vehicle. Individual phases of said at least one converter can be operated as independent direct-current controllers for independent charging and discharging of different energy storage devices.

15 Claims, 1 Drawing Sheet

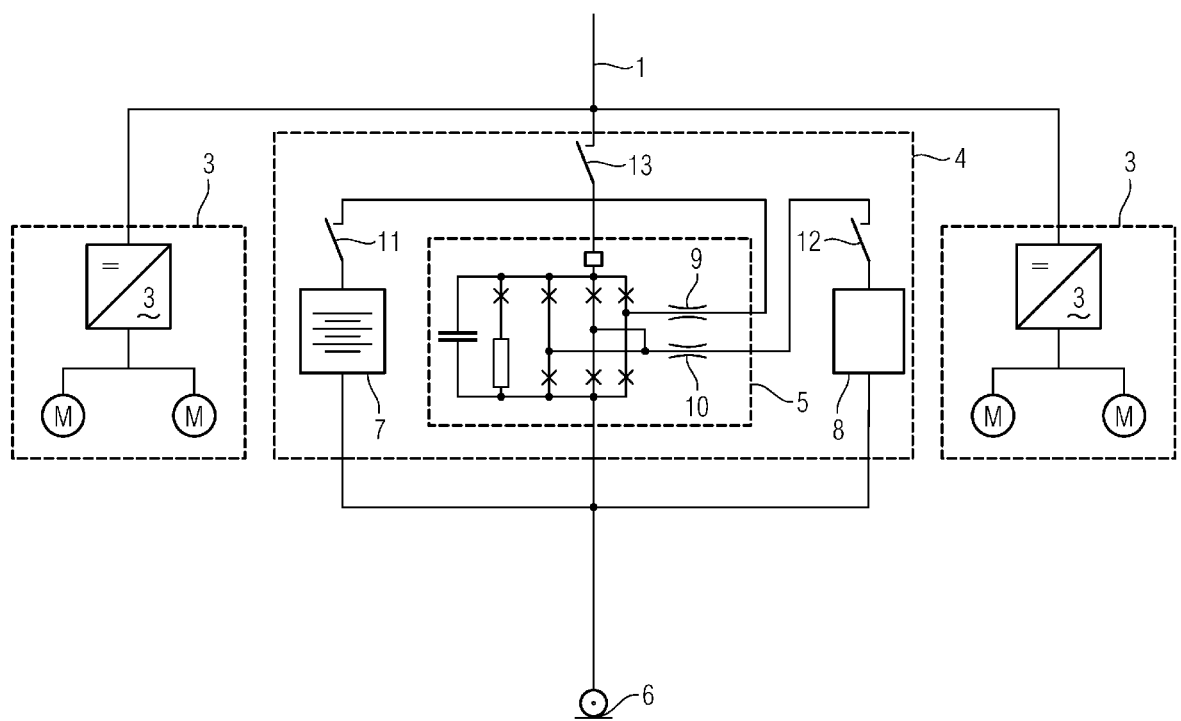

POWER STORAGE SYSTEM FOR A RAIL-GUIDED VEHICLE

BACKGROUND OF THE INVENTION

Field of the Invention

The invention relates to an energy storage system for a track-guided vehicle, with at least one electrical energy storage device and at least one electrochemical energy storage device being connected via at least one converter to a supply line and to a drive unit for the vehicle.

An energy storage system such as this is known from the prior German patent application 10 2007 032 776. Two DC/DC controllers are used as converters there. The energy interchange between the drive unit and the energy storage devices of the energy storage system is controlled and/or regulated by an energy management unit.

EP 1 424 494 A1 discloses a diesel-electric drive system which, as energy storage devices, has both an electrical energy storage device, for example an ultracap, and an electrochemical energy storage device, for example a nickel-cadmium battery. In what is known, these two energy storage devices are connected to one another via a so-called step-down converter. The electrical energy storage device is connected directly to the intermediate circuit of a converter.

In order to allow the two existing energy storage devices to be used optimally for operation of the drive unit, a complex energy management unit has been required until now.

BRIEF SUMMARY OF THE INVENTION

The invention is based on the object of specifying an energy storage system for a track-guided vehicle, in which different energy storage devices, for example an electrochemical battery and/or an ultracap, can be operated completely independently of one another.

According to the invention, the object is achieved in that individual phases of the converter can be operated as independent direct-current controllers for independent charging and discharging of different energy storage devices.

Converters are known per se and, for example, are connected upstream of the drive motors in rail vehicles.

When a conventional converter is used to connect different energy storage devices to the drive unit, this surprisingly results in the advantage that different energy storage devices, for example ultracaps and electrochemical batteries, can be operated completely independently of one another using simpler means than in the past. Different voltages are possible on the energy storage devices, or else different charging and/or discharging characteristics for the energy storage devices, as well as different energy storage device power levels. Only one commercially available converter is required, possibly with modified software, in order to replace the previously required converters with an energy management unit.

The dependent claims specify advantageous developments and refinements of the invention.

One example of an electrical energy storage device is a double-layer capacitor or a superconducting energy storage device. One example of an electrochemical energy storage device is a nickel-metal-hydride battery. By way of example, chopper inductors, one or more control or regulating units and various switching devices are connected to the energy storage devices.

The electrical energy storage device is, for example, an ultracap, and the electrochemical energy storage device is, for example, a battery.

By way of example, the converter is a polyphase pulse-controlled inverter. Each phase therein can be operated independently as a direct-current controller, using suitable software. This is therefore particular highly suitable for providing a dedicated chopper for each of the energy storage devices.

For example, the converter has three phases and each of the three phases is used as the chopper for regulating the charging and discharging processes. Even three separate energy storage devices or two energy storage devices, in which two phases are operated in parallel in the case of one energy storage device in order to increase the power, or just one energy storage device, in which three phases are operated in parallel in order to increase the power, can be connected to a three-phase pulse-controlled inverter.

By way of example, the energy storage system comprises a single-phase or polyphase converter with or without integrated or additive braking controller or overvoltage limiter, one and/or more electrical energy storage devices, for example based on double-layer capacitors, one and/or more electrochemical energy storage devices, for example based on nickel-metal-hydride batteries, a corresponding number of chopper inductors, one or more control/regulator units and various switching devices.

The energy storage system is connected to the intermediate circuit of the drive system, for example without an inductor or via one or more inductors. The energy storage system may also be connected via one or more inductors directly to the power supply system voltage.

This combination of an electrical energy storage device and an electrochemical energy storage device with a conventional converter makes it possible to optimally exploit the advantages of the systems, specifically the specific power of the electrical stores and the high specific energy content of electrochemical energy storage devices, in conjunction with the commercially available converter technology.

Furthermore, this hybrid energy storage system can easily be integrated in new vehicles, and can also be integrated retrospectively in existing, older vehicles. The life in particular of the electrochemical energy storage device is considerably increased by the combined method of operation.

BRIEF DESCRIPTION OF THE DRAWING

The single FIGURE of the drawing is a schematic and block diagram of the energy storage system according to the invention.

DETAILED DESCRIPTION OF THE INVENTION

The drawing shows a supply line 1, with this supply line 1 being connected to drive units 3. The drive units 3 may contain at least one power supply system inductor, which is not shown, in the respective supply line. The supply line 1 is also connected to an energy storage system 4. The energy storage system 4 may contain at least one power supply system inductor, which is not shown, in the respective supply line. In the energy storage system 4, the supply line 1 is connected to the intermediate circuit of a pulse-controlled inverter 5, which is also connected at ground point 6. An electrochemical energy storage device 7 is connected to one phase of the pulse-controlled inverter 5. An ultracap 8 is connected as an electrical energy storage device to another phase of the pulse-controlled inverter 5. Both the electrochemical energy storage device 7 and the ultracap 8 are connected to the ground point 6. Inductors 9, 10 as well as optional switches 11, 12 or fuses are arranged in the connecting lines between the two energy storage devices and the pulse-controlled inverter 5. A switch 13 is also optionally located in the supply line 1, upstream of the energy storage system 4.

The pulse-controlled inverter 5 in the illustrated circuit is used as a reliable chopper for the electrochemical energy storage device 7 and for the ultracap 8.

The invention claimed is:

1. An energy storage system for a track-guided vehicle having a drive unit and a supply line, the energy storage system comprising:
    a plurality of energy storage devices including at least one electrical energy storage device and at least one electrochemical energy storage device; and
    at least one converter electrically connecting said plurality of energy storage devices in parallel to the drive unit of the track-guided vehicle;
    said at least one converter electrically connecting said at least one electrical energy storage device and said at least one electrochemical energy storage device to the supply line;
    said supply line also connected to the drive unit of the track-guided vehicle;
    said at least one converter being a polyphase direct-current controller having individual phases to be operated as independent direct-current controllers for independent charging and discharging of different ones of said plurality of energy storage devices.

2. The energy storage system according to claim 1, wherein said at least one converter has three phases, and each of said three phases is used as a chopper for regulation of charging and discharging processes.

3. The energy storage system according to claim 1, wherein said at least one converter is equipped with an integrated braking controller, an additive braking controller or an overvoltage limiter.

4. The energy storage system according to claim 3, wherein said integrated braking controller, said additive braking controller or said overvoltage limiter can be used not only to limit incoming overvoltages but also for discharging said electrical energy storage device.

5. The energy storage system according to claim 1, which further comprises at least one power supply system inductor connected between said at least one converter and the supply line.

6. The energy storage system according to claim 1, which further comprises inductors connecting said electrical energy storage device and said electrochemical energy storage device to said at least one converter.

7. The energy storage system according to claim 1, wherein the track-guided vehicle is a locomotive, a prime mover, a shunting locomotive, a city railroad, a metro or a tram system.

8. The energy storage system according to claim 1, wherein said electrochemical energy storage device is selected from the group consisting of a lead-acid battery, a nickel-cadmium battery, a nickel-metal-hydride battery, a lithium-ion battery, a zebra battery, an NaS battery or a redox-flow battery.

9. The energy storage system according to claim 1, wherein said electrical energy storage device and said electrochemical energy storage device form one unit.

10. The energy storage system according to claim 9, wherein said one unit is a pseudocap.

11. The energy storage system according to claim 1, wherein the energy storage system is disposed at a location selected from the group consisting of within the vehicle, on a vehicle roof and under a floor.

12. The energy storage system according to claim 1, wherein the energy storage system includes a plurality of individual systems.

13. The energy storage system according to claim 1, which further comprises a central energy regulating unit or a plurality of energy regulating units disposed in the vehicle.

14. A combination, comprising:
    a track-guided vehicle having a drive unit and a supply line, and an energy storage system for said track-guided vehicle;
    said energy storage system including:
        a plurality of energy storage devices including at least one electrical energy storage device and at least one electrochemical energy storage device; and
        at least one converter electrically connecting said plurality of energy storage devices in parallel to said drive unit of said track-guided vehicle;
        said at least one converter electrically connecting said at least one electrical energy storage device and said at least one electrochemical energy storage device to said supply line;
        said supply line also connected to the drive unit of said track-guided vehicle;
        said at least one converter being a polyphase direct-current controller having individual phases to be operated as independent direct-current controllers for independent charging and discharging of different ones of said plurality of energy storage devices.

15. The energy storage system according to claim 14, wherein the track-guided vehicle is a locomotive, a prime mover, a shunting locomotive, a city railroad, a metro or a tram system.

* * * * *